(12) United States Patent
Nakajima et al.

(10) Patent No.: US 9,184,543 B2
(45) Date of Patent: Nov. 10, 2015

(54) ELECTRICAL CONNECTOR

(71) Applicants: Nissan Motor Co., Ltd., Yokohama-shi, Kanagawa (JP); Yazaki Corporation, Minato-ku, Tokyo (JP)

(72) Inventors: Tsuyoshi Nakajima, Sagamihara (JP); Kenji Sekinada, Yokohama (JP); Takenori Ohmura, Kakegawa-shi (JP)

(73) Assignees: Nissan Motor Co., Ltd., Yokohama (JP); Yazaki Corporation, Tokyo (JP)

( * ) Notice: Subject to any disclaimer, the term of this patent is extended or adjusted under 35 U.S.C. 154(b) by 46 days.

(21) Appl. No.: 14/361,957

(22) PCT Filed: Dec. 20, 2012

(86) PCT No.: PCT/JP2012/083048
§ 371 (c)(1),
(2) Date: May 30, 2014

(87) PCT Pub. No.: WO2013/108542
PCT Pub. Date: Jul. 25, 2013

(65) Prior Publication Data
US 2014/0287614 A1    Sep. 25, 2014

(30) Foreign Application Priority Data

Jan. 16, 2012 (JP) ................................. 2012-005834

(51) Int. Cl.
*H01R 3/00* (2006.01)
*H01R 13/641* (2006.01)
(Continued)

(52) U.S. Cl.
CPC .......... *H01R 13/641* (2013.01); *B60L 11/1818* (2013.01); *H01R 13/6275* (2013.01);
(Continued)

(58) Field of Classification Search
CPC ........................... H01R 13/641; H01R 13/6397
USPC .................. 439/489, 304, 310, 133, 353, 357
See application file for complete search history.

(56) References Cited

U.S. PATENT DOCUMENTS

| 5,417,579 | A | * | 5/1995 | Yoshioka | ............ | B60L 11/1818 |
| | | | | | | 439/310 |
| 5,545,049 | A | * | 8/1996 | Hasegawa | ........... | B60L 11/1818 |
| | | | | | | 439/310 |

(Continued)

FOREIGN PATENT DOCUMENTS

| EP | 0634818 A2 | 1/1995 |
| EP | 0635908 A2 | 1/1995 |

(Continued)

*Primary Examiner* — Abdullah Riyami
*Assistant Examiner* — Thang Nguyen
(74) *Attorney, Agent, or Firm* — Global IP Counselors, LLP

(57) ABSTRACT

A power-supplying electrical connector includes an engagement mechanism configured to engage a power-receiving electrical connector, the engagement mechanism having a pair of engaging members, and an indicator member configured to disengage from the engagement mechanism and move from a charging-disabled position to a charging-enabled position, when the engagement mechanism has engaged the power-receiving electrical connector. While the indicator member is held in the charging-disabled position, the engagement mechanism is configured to cause the first engaging member and the indicator member to disengage after a second engaging member of the pair of engaging members and the indicator member has engaged while the power-supplying electrical connector is attached to the power-receiving electrical connector, and while the power-supplying electrical connector and the power-receiving electrical connector remain attached and engaged, the engagement mechanism is configured to cause the second engaging member and the indicator member to disengage.

13 Claims, 13 Drawing Sheets

(51) Int. Cl.
*B60L 11/18* (2006.01)
*H01R 13/627* (2006.01)
*H01R 13/631* (2006.01)

(52) U.S. Cl.
CPC .......... *B60L2250/10* (2013.01); *B60L 2270/32* (2013.01); *B60L 2270/34* (2013.01); *H01R 13/631* (2013.01); *Y02T 10/7005* (2013.01); *Y02T 90/14* (2013.01)

(56) References Cited

U.S. PATENT DOCUMENTS

| | | | |
|---|---|---|---|
| 5,674,086 A * | 10/1997 | Hashizawa | B60L 11/1818 439/310 |
| 5,906,500 A | 5/1999 | Kakuta et al. | |
| 6,652,306 B2 * | 11/2003 | Karamatsu | H01R 13/62933 439/157 |
| 8,500,476 B2 * | 8/2013 | Hori | H01R 13/62944 439/310 |
| 9,088,096 B2 * | 7/2015 | Toratani | H01R 13/639 1/1 |

FOREIGN PATENT DOCUMENTS

| | | |
|---|---|---|
| JP | 6-188044 A | 7/1994 |
| JP | 2002-352909 A | 12/2002 |
| JP | 2010-282784 A | 12/2010 |
| JP | 2011-138644 A | 7/2011 |

\* cited by examiner

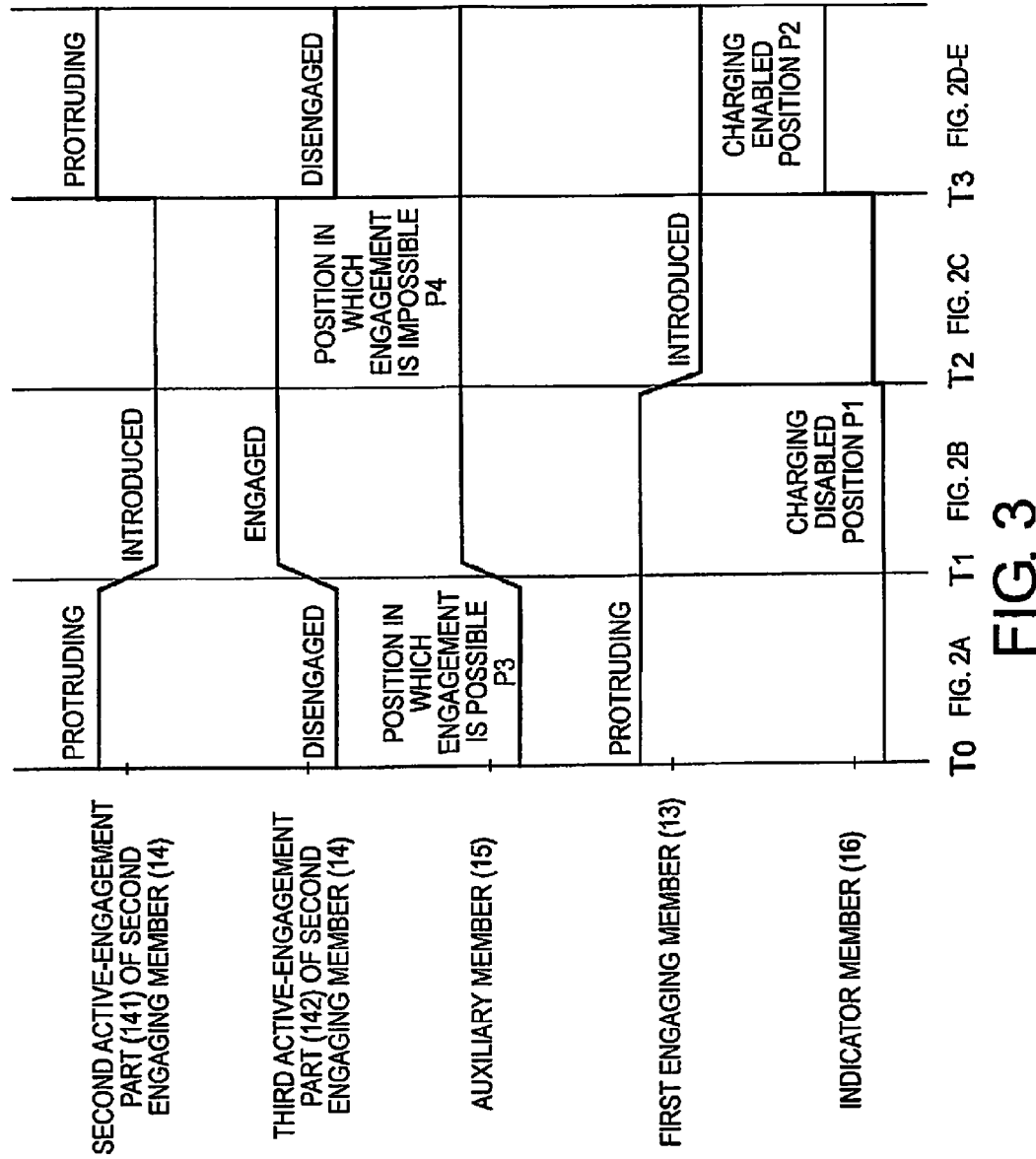

ELECTRICAL CONNECTOR

CROSS-REFERENCE TO RELATED APPLICATIONS

This application is a U.S. National stage application of International Application No. PCT/JP2012/083048, filed Dec. 20, 2012, which claims priority to Japanese Patent Application No. 2012-005834 filed in Japan on Jan. 16, 2012, the contents of which are hereby incorporated herein by reference.

BACKGROUND

1. Field of the Invention

The present invention relates to a power-supplying electrical connector used for charging an electric vehicle or the like.

2. Background Information

The device disclosed in Japanese Laid-Open Patent Application No. 6-188044 is known as a power-supplying electrical connector that is attached to a power-receiving electrical connector in an electric vehicle and supplies electric power from a charger to a battery in the electric vehicle. This charging connector comprises a connector body attached to the power-receiving electrical connector, a handle for accommodating the connector body so as to be capable of sliding coaxially therewith, and a lever that is pivotally attached to the handle. While the handle is gripped, the connector body is inserted into and provisionally locked in the power-receiving electrical connector, and when the lever is grasped tightly in this state, the connector body advances further toward the power-receiving electrical connector, and the power-supplying electrical connector and power-receiving electrical connector become completely locked.

SUMMARY

However, since a conventional power-supplying electrical connector requires the lever to be grasped in order to completely lock the power-supplying electrical connector to the power-receiving electrical connector, a problem is presented in regard to the increased complexity of the operation of attaching the power-supplying electrical connector.

A problem to be solved by the invention is to provide a power-supplying electrical connector that is simpler to attach.

In the present invention, a power-supplying electrical connector is configured to engage a power-receiving electrical connector while a first engaging member and an indicator member are engaged, and a second engaging member and the indicator member are engaged while the power-supplying electrical connector is inserted into the power-receiving electrical connector, whereupon the first engaging member and the indicator member are disengaged, and the second engaging member and the indicator member are disengaged when the power-supplying electrical connector and a charging connector are completely engaged, and the indicator member is moved from a charging-disabled position to a charging-enabled position. The aforedescribed problems are thereby resolved.

According to the present invention, it is possible to cause the power-supplying electrical connector and the charging connector to engage with each other merely by inserting the power-supplying electrical connector into the power-receiving electrical connector. Moreover, because the indicator member moves from a charging-disabled position to a charging-enabled position when the connectors engage with each other, an operator can recognize that the power-supplying electrical connector has completely engaged.

BRIEF DESCRIPTIONS OF THE DRAWINGS

Referring now to the attached drawings which form a part of this original disclosure.

FIG. 3 is a time chart showing the movement of the engagement mechanism in each stage of FIGS. 2A through 2E.

DETAILED DESCRIPTION OF THE EMBODIMENTS

Embodiment 1

Figure 1:
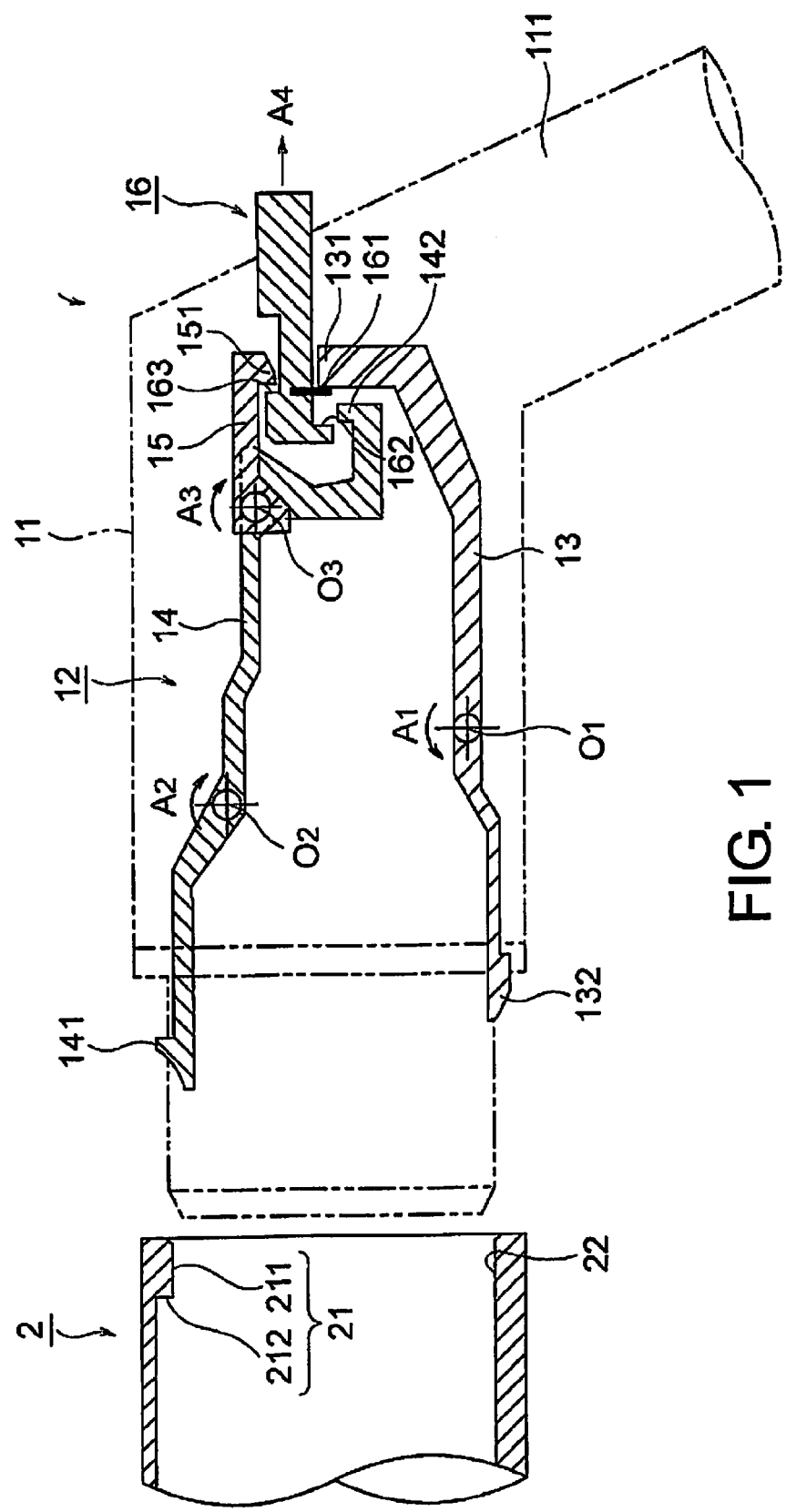
FIG. 1 is a component sectional view showing the power-supplying electrical connector of the first embodiment.

First, the primary functions of an engagement mechanism 12 for a power-supplying electrical connector 1 and an indicator member 16 of the present embodiment will be described with reference to FIGS. 1 through 3. The power-supplying electrical connector 1 of the present embodiment is attached to a power-receiving electrical connector 2 of an object to be charged such as an electric vehicle or the like, and electrical power is supplied from a charger (not shown). The connector body of the power-supplying electrical connector 1 is provided within a housing 11, and is connected to the charger by a cable. Although the connector body and the cable are not shown in the drawings, the connector body of the power-supplying electrical connector 1 of the present embodiment is of a type that is fixed to the housing 11 (incapable of moving in either direction). When a grip 111 of the housing 11 is grasped and the power-supplying electrical connector 1 is inserted into the power-receiving electrical connector 2, a power-supplying terminal and a power-receiving terminal are connected, and the engagement mechanism 12 engages with and locks with the power-receiving electrical connector 2. An operator will recognize that the power-supplying electrical connector 1 has engaged with the power-receiving electrical connector 2 by the fact that the indicator member 16 has moved from a charging-disabled position P1 to a charging-enabled position P2, and will perform a subsequent predetermined charging operation.

The engagement mechanism 12 of the present embodiment comprises a first engaging member 13, a second engaging member 14, and an auxiliary member 15. These elements engage with or disengage from the power-receiving electrical connector 2 and the indicator member 16, whereby engagement with the power-receiving electrical connector 2 is achieved and movement of the indicator member 16 occurs. As shown in FIG. 1, the first engaging member 13 is provided on the lower part of the power-supplying electrical connector 1, and the second engaging member 14 is provided on the upper part of the power-supplying electrical connector 1 approximately diametrically opposite the first engaging member 13.

Figure 2A:
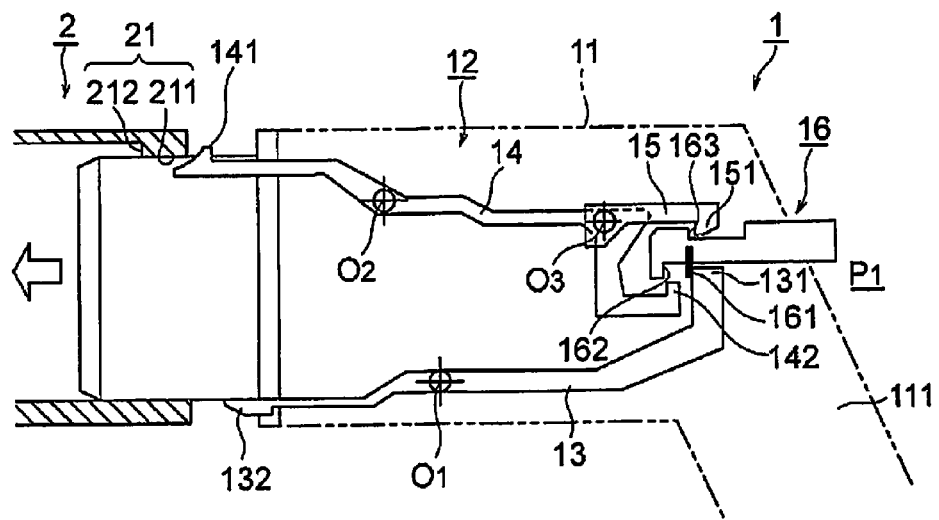
FIG. 2A is a sectional view showing the movement of the engagement mechanism when the power-supplying electrical connector of FIG. 1 is attached to the power-receiving electrical connector ((1) Before engagement).
Figure 2B:
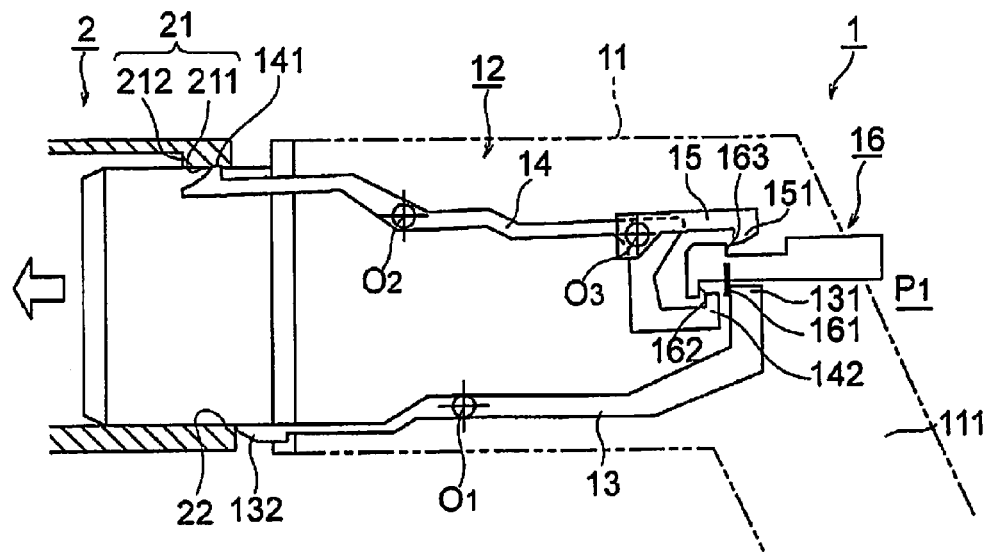
FIG. 2B is a sectional view showing the movement of the engagement mechanism when the power-supplying electrical connector of FIG. 1 is attached to the power-receiving electrical connector ((2) Initial stage of engagement).
Figure 2C:
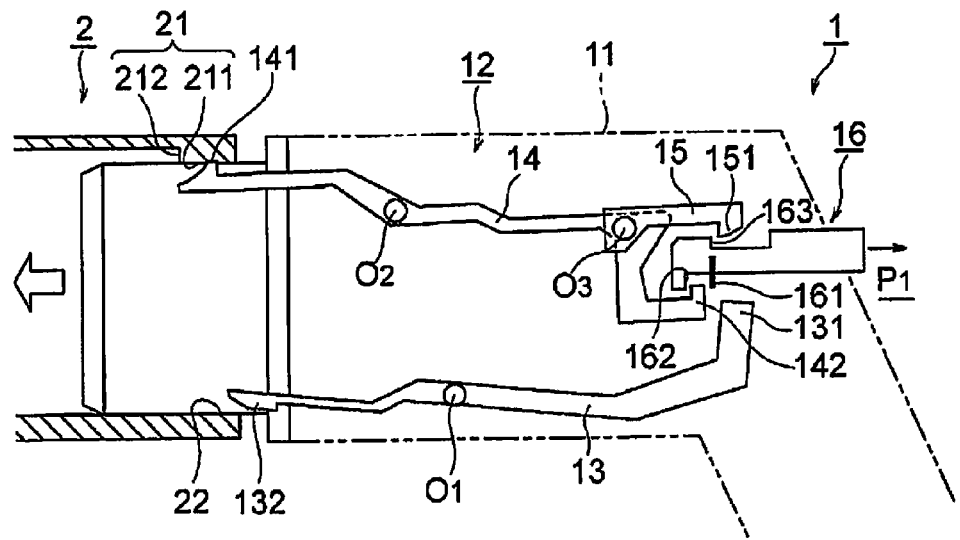
FIG. 2C is a sectional view showing the movement of the engagement mechanism when the power-supplying electrical connector of FIG. 1 is attached to the power-receiving electrical connector ((3) Intermediate stage of engagement).
Figure 2D:
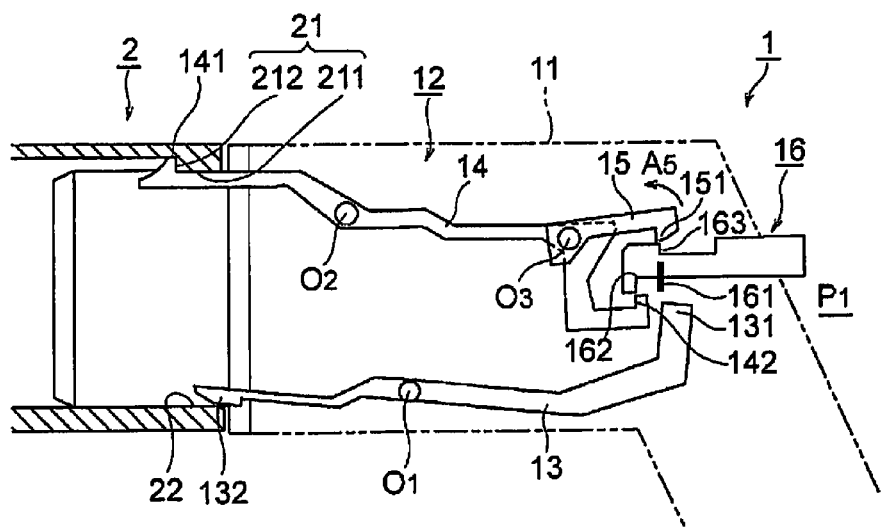
FIG. 2D is a sectional view showing the movement of the engagement mechanism when the power-supplying electrical connector of FIG. 1 is attached to the power-receiving electrical connector ((4) Final stage of engagement).
Figure 2E:
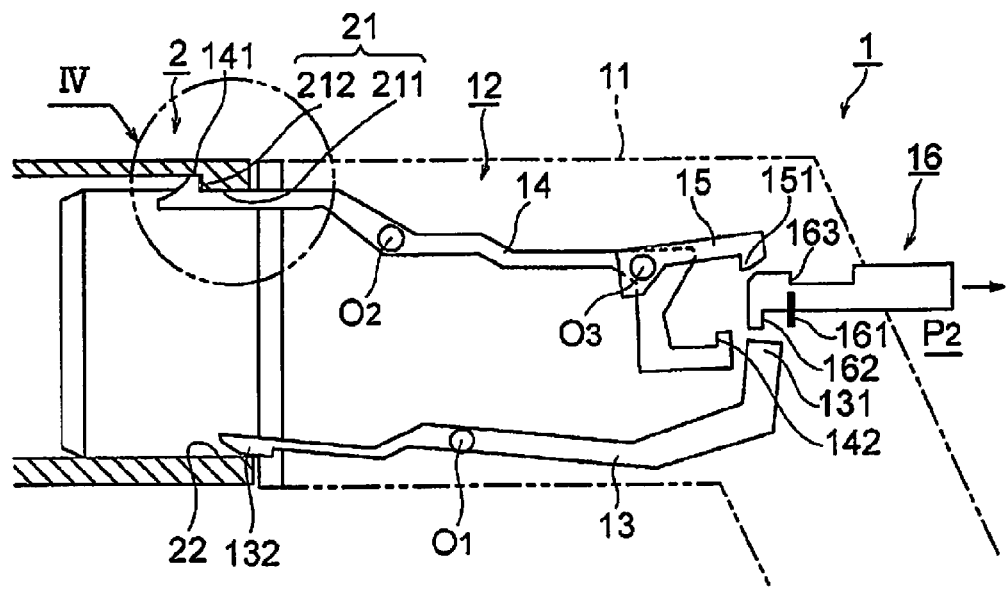
FIG. 2E is a sectional view showing the movement of the engagement mechanism when the power-supplying electrical connector of FIG. 1 is attached to the power-receiving electrical connector ((5) Complete engagement).

The first engaging member 13 is a link member rotatably supported in the housing 11 about a point O1 as a center of rotation, as shown in FIG. 1. A first active-engagement part 131 is formed at one end part of the first engaging member 13 toward the proximal end of the power-supplying electrical connector 1, and a contact part 132 is formed at one end part of the first engaging member 13 toward the distal end of the power-supplying electrical connector 1. The first active-engagement part 131 on the proximal end engages with a first passive-engagement part 161 of the indicator member 16 while the contact part 132 on the distal end protrudes as shown in FIG. 1, and disengages from the first passive-engagement part 161 of the indicator member 16 while the contact part 132 is introduced as shown in FIGS. 2C through 2E.

The first engaging member 13 is provided with an elastic body such as a coil spring or the like at the center of rotation O1 etc., and is elastically biased along the direction of rotation A1 as shown in FIG. 1. While in an unloaded state, the first engaging member 13 assumes a protruding position as shown in FIGS. 1, 2A, and 2B. When contacting a contact part 22 of the power-receiving electrical connector 2, the first engaging member 13 pivots against the elastic biasing to an introduction position as shown in FIGS. 2C through 2E.

The second engaging member 14 is a link member rotatably supported in the housing 11 around a point O2 as a center of rotation, as shown in FIG. 1. A second active-engagement part 141 is formed at one end part of the second engaging member 14 toward the distal end of the power-supplying electrical connector 1, and a third active-engagement part 142 is formed at one end part of the second engaging member 14 toward the proximal end of the power-supplying electrical connector 1. The second engaging member 14 is provided with an elastic body such as a coil spring or the like at the center of rotation O2 etc., and is elastically biased along the direction of rotation A2 as shown in FIG. 1.

While in an unloaded state, the second active-engagement part 141 on the distal end is in a protruding position as shown in FIGS. 1 and 2A. While in contact with a convex part 211 on a second passive-engagement part 21 of the power-receiving electrical connector 2, the second active-engagement part 141 is in an introduction position as shown in FIGS. 2B and 2C. When the second active-engagement part 141 moves beyond the convex part 211 on the second passive-engagement part 21, the second active-engagement part 141 is returned to a protruding position as shown in FIGS. 2D and 2E by the elastic biasing and engages with a step part 212.

Figure 4:
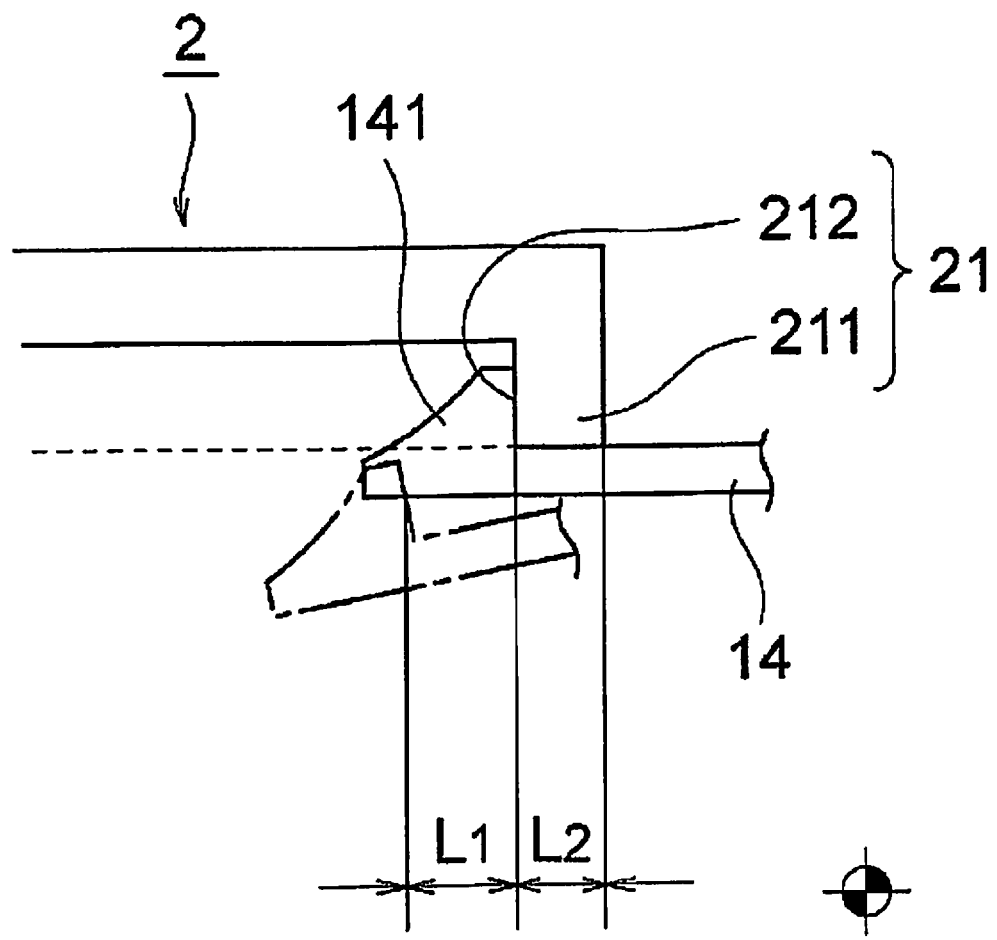
FIG. 4 is an enlargement of portion IV in FIG. 2E.

Because the second active-engagement part 141 is provided on an upper part with respect to the center of rotation A2 in a lateral view as shown in FIG. 1, the second active-engagement part 141 withdraws by L1 in the axial direction (attaching direction) of the power-supplying electrical connector 1, as shown enlarged in FIG. 4, when pivoting from the introduction position shown by the phantom line to the protruding position shown by the solid line. Consequently, in a case where the second active-engagement part 141 is not completely engaged with the second passive-engagement part 21 of the power-receiving electrical connector 2 when the second active-engagement part 141 moves beyond the convex part 211 on the second passive-engagement part 21 and then engages with the step part 212, the second active-engagement part 141 pulls in the withdrawing direction and completely engages with the second passive-engagement part 21.

The second active-engagement part 141 withdraws by L1 in the axial direction of the power-supplying electrical connector 1 when pivoting from the introduction position to the protruding position as described above, but it is possible to set length L2 in the axial direction of the convex part 211 on the second passive-engagement part 21 of the power-receiving electrical connector 2 such that L2<L1. The second active-engagement part 141 is thereby prevented from stopping partway along the convex part 211, and either completely engages with or disengages from the second passive-engagement part 21.

The following description again makes reference to FIG. 1. While the second active-engagement part 141 on the distal end protrudes as shown in FIG. 1, the third active-engagement part 142 on the proximal end is disengaged from a fourth passive-engagement part 163 of the indicator member 16. With the second active-engagement part 141 introduced as shown in FIGS. 2B and 2C, the third active-engagement part 142 engages with the fourth passive-engagement part 163 of the indicator member 16.

The auxiliary member 15 is a link member rotatably supported on the proximal end of the second engaging member 14 about a point O3 as a center of rotation. A fourth active-engagement part 151 is formed on the distal end of the auxiliary member 15 relative to the center of rotation O3. The auxiliary member 15 is provided with an elastic body such as a coil spring or the like at the center of rotation O3 etc., and is elastically biased along the direction of rotation A3 as shown in FIG. 1. While in an unloaded state, the fourth active-engagement part 151 of the auxiliary member 15 rotates in association with the second engaging member 14 as shown in FIGS. 1 and 2A through 2C. In a case where the second active-engagement part 141 of the second engaging member 14 is in a protruding position, the fourth active-engagement part 151 is in a position allowing engagement with the fourth passive-engagement part 163 of the indicator member 16 (called "P3" below) as shown in FIGS. 1 and 2A, but when the second active-engagement part 141 of the second engaging member 14 is in an introduction position, the fourth active-engagement part 151 rotates in association to a position where engagement with the fourth passive-engagement part 163 of the indicator member 16 is impossible (called "P4" below) as shown in FIGS. 2B and 2C.

In a case where the auxiliary member 15 is in the position P4 shown in FIG. 2C, in which engagement is impossible, when the indicator member 16 advances further to the right as in FIG. 2C, the auxiliary member 15 pivots in the direction of arrow A5 so as to pass over and not engage with the fourth passive-engagement part 163 of the indicator member 16 until the indicating part 16 withdraws. The auxiliary member 15 of the present embodiment is a member for causing the indicator member 16 disengaged from the first active-engagement part 131 to be kept from moving to a charging-enabled position in a case where, for any reason, the contact part 132 of the first engaging member 13 is introduced without the second active-engagement part 141 of the second engaging member 14 being introduced.

The following description makes reference once more to FIG. 1. The indicator member 16 is retractably supported in the housing 11; the first passive-engagement part 161, a third passive-engagement part 162, and the fourth passive-engagement part 163 are formed on the indicator member 16; and the indicator member 16 is elastically biased in a direction A4 by an elastic body such as a coil spring or the like. When the first passive-engagement part 161 and the first active-engagement part 131 of the first engaging member 13 engage, the indicator member 16 is held in an introduction position (called 'charging-disabled position P1' below) by the housing 11 against the elastic biasing. Even when the first active-engagement part 131 is disengaged from the first passive-engagement part 161, the indicator member 16 is held in the introduction position (charging-disabled position P1) when the fourth passive-engagement part 163 engages with the fourth active-engagement part 151 of the auxiliary member 15.

Furthermore, even when the first active-engagement part 131 is disengaged from the first passive-engagement part 161, the indicator member 16 is likewise held in the introduction position (charging-disabled position P1) when the third passive-engagement part 162 is engaged with the third active-engagement part 142 of the second engaging member 14. However, when the three modes of engagement described above are disengaged, the indicator member 16 is elastically biased to a protruding position (called 'charging-enabled position P2' below) shown in FIG. 2E. The operator sees whether the indicator member 16 is in the charging-disabled position P1 or the charging-enabled position P2, and recognizes whether or not the power-supplying electrical connector 1 is completely engaged with the power-receiving electrical connector 2. The indicator member 16 may also be used in tandem with a release member for detaching the power-supplying electrical connector 1 from the power-receiving electrical connector 2.

The power-receiving electrical connector 2 has a shell for receiving the distal end portion of the power-supplying electrical connector 1. The second passive-engagement part 21 is formed on the upper part of the shell, and the contact part 22 is formed on the lower part of the shell approximately diametrically opposite from the second passive-engagement part 21. The second passive-engagement part 21 has the convex part 211 and the step part 212 as described above. The second active-engagement part 141 of the second engaging member 14 is introduced on the convex part 211, and the step part 212 engages with the second active-engagement part 141. The contact part 132 of the first engaging member 13 is introduced on the contact part 22.

The action of the invention will be described next. As shown in FIGS. 2A and 3 (time T0 to T1), before the power-supplying electrical connector 1 is attached to the power-receiving electrical connector 2, the first active-engagement part 131 of the first engaging member 13 and the first passive-engagement part 161 of the indicator member 16 engage when the indicator member 16 is introduced to the charging-disabled position P1. The indicator member 16 is thereby held in the charging-disabled position P1. The second active-engagement part 141 of the second engaging member 14 will be in a protruding position, the third active-engagement part 142 will not be in engagement with the third passive-engagement part 162 of the indicator member 16, and the fourth active-engagement part 151 of the auxiliary member 15 will be in position P3, at which engagement with the fourth passive-engagement part 163 of the indicator member 16 is possible.

When the power-supplying electrical connector 1 is advanced further from this state in the attaching direction toward the power-receiving electrical connector 2, the second active-engagement part 141 of the second engaging member 14 is first introduced via the convex part 211 on the power-receiving electrical connector 2, and the second engaging member 14 thereby rotates counterclockwise around the point O2 as the center of rotation correspondingly with respect to the distance the second active-engagement part 141 is introduced, as shown in FIGS. 2B and 3 (time T1 to T2). The rotation of the second engaging member 14 causes the third active-engagement part 142 of the second engaging member 14 to engage with the third passive-engagement part 162 of the indicator member 16, and the fourth active-engagement part 151 of the auxiliary member 15 to rotate in association to the position P4 at which engagement with the third passive-engagement part 162 of the indicator member 16 is impossible.

When the power-supplying electrical connector 1 is advanced even further, the contact part 132 of the first engaging member 13 is introduced via the contact part 22 of the power-receiving electrical connector 2, and the first engaging member 13 thereby rotates clockwise around the point O1 as the center of rotation correspondingly with respect to the distance the contact part 132 is introduced, as shown in FIGS. 2C and 3 (time T2 to T3). The first active-engagement part 131 and the first passive-engagement part 161 of the indicator member 16 are disengaged by the rotation of the first engaging member 13, but because the third passive-engagement part 162 of the indicator member 16 was previously engaged with the third active-engagement part 142 of the second engaging member 14, the indicator member 16 is held in the charging-disabled position P1 despite advancing slightly. The fourth active-engagement part 151 of the auxiliary member 15 maintains the position P4 in which engagement with the third engaged member 162 of the indicator member 16 is impossible.

When the power-supplying electrical connector 1 is advanced even further, because the second active-engagement part 141 of the second engaging member 14 moves beyond the convex part 211 to the step part 212, the second engaging member 14 rotates clockwise by elastic biasing and engages with the step part 212, as shown in FIGS. 2D and 3 (time T3 onward). The third active-engagement part 142 and the third passive-engagement part 162 of the indicator member 16 are disengaged by the rotation of the second engaging member 14, and therefore the indicator member 16 advances further into the charging-enabled position P2 by elastic biasing as shown in FIGS. 2E and 3. When the indicator member 16 moves into the charging-enabled position P2, the fourth active-engagement part 151 of the auxiliary member 15 rotates relative to the second engaging member 14 in direction A5 shown in FIG. 2D, and does not engage with the fourth passive-engagement part 163 of the indicator member 16. The contact part 132 of the first engaging member 13 is kept in an introduced state in FIGS. 2D and 2E.

Thus, according to the power-supplying electrical connector 1 of the present embodiment, the second active-engagement part 141 can be caused to engage with the second passive-engagement part 21 merely by grasping the grip 111 of the power-supplying electrical connector 1 and attaching the power-supplying electrical connector 1 to the power-receiving electrical connector 2; therefore, the attaching operation is simplified, and the number of components even in the engagement mechanism 11 that constitutes the power-supplying electrical connector 1 can be reduced.

After the second active-engagement part 141 of the second engaging member 14 is introduced via the convex part 211 of the second passive-engagement part 21, the contact part 132 of the first engaging member 13 is then introduced via the contact part 22 of the power-receiving electrical connector 2, the second active-engagement part 141 of the second engaging member 14 is then made to protrude by the step part 212 of the second passive-engagement part 21, and the indicator member 16 moves to the charging-enabled position P2 for the first time (time T3 of FIG. 3). Therefore, the charging-disabled state affected by the indicator member 16 will not be canceled unless the power-supplying electrical connector 1 is inserted into the interior of the power-receiving electrical connector 2.

Because the auxiliary member 15 is provided in the present embodiment, the fourth active-engagement part 151 of the auxiliary member 15 and the fourth passive-engagement part 163 of the indicator member 16 engage even in a case where, for any reason, the contact part 132 of the first engaging member 13 is introduced without the second active-engagement part 141 of the second engaging member 14 being introduced. It is thereby possible to inhibit the indicator member 16, which has been disengaged from the first active-engagement part 131, from moving to a charging-enabled position.

Other Embodiments

An alternative configuration may be adopted in which a charging-enabled signal is outputted to the charger in a case where there is provided a securing member such as a pin for mechanically securing the indicator member 16 shown in FIG. 2E once the indicator member 16 has moved into the charging-enabled position P2; where there is provided a sensor such as a microswitch for detecting whether or not the securing member has secured the indicator member 16; and where it has been detected that the indicator member 16 has moved into the charging-enabled position P2 and has been completely secured by the securing member. The charging-enabled signal transmitted to the charger may be configured so as to activate a relay provided in front of an output terminal of the charger. The power-supplying electrical connector 1 can thereby be attached to the power-receiving electrical connector 2 in a more reliable, robust, and safe manner.

Figure 5:
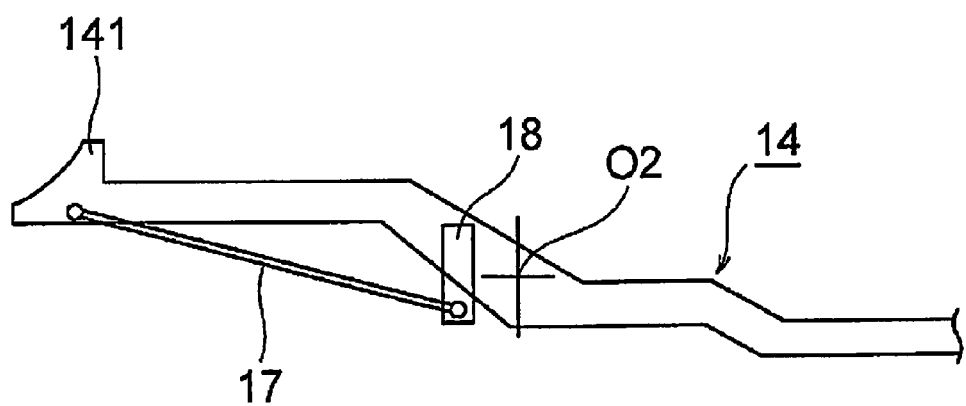
FIG. 5 is a sectional view of the second engaging member, showing another embodiment.

Because the second engaging member 14 protrudes and engages with the step part 212 after being introduced via the convex part 211 of the power-receiving electrical connector 2, the second engaging member 14 might damage the power-supplying electrical connector 1 when the power-supplying electrical connector 1 is pulled with excessive force while the second engaging member 14 is engaged. Therefore, a configuration may be adopted in which a damage-sensing member 17 is provided in a vulnerable portion, such as between the second active-engagement part 141 and the center of rotation O2 as shown in FIG. 5, the damage-sensing member 17 being disposed across the gap. A microswitch 18 is provided at one end of the damage-sensing member 17; and, when the second active-engagement part 141 bends back and forth or breaks, this event is sensed by the damage-sensing member 17 and the microswitch 18, and a signal for prohibiting charging is outputted.

Figure 6A:
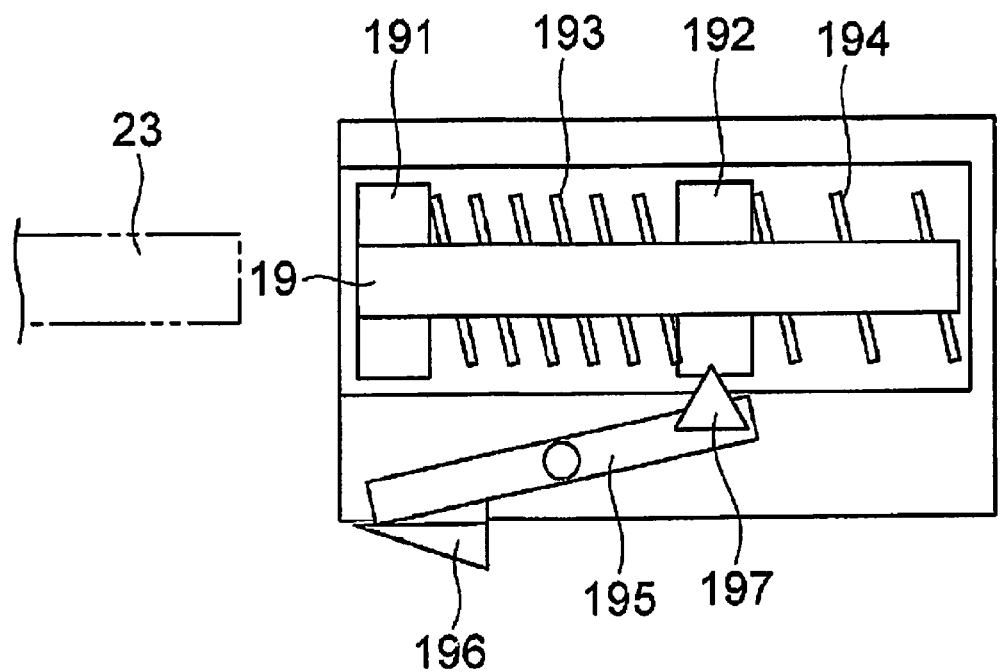
FIG. 6A is a sectional view of the power-supplying terminal, showing a further embodiment.

FIG. 6A is a sectional view showing a power-supplying terminal 19 of the connector body provided within the housing 11 to the power-supplying electrical connector 1. Electric power is supplied as a result of the power-supplying terminal 19 being connected to a power-receiving terminal 23 of the power-receiving electrical connector 2. When the power-supplying terminal 19 is connected to the power-receiving terminal 23, a movable member 191 is biased at the distal end of the power-supplying terminal 19 toward the left of the drawing by elastic bodies 193, 194 such as coil springs. In the present embodiment, a middle plate 192 is interposed between the two elastic bodies 193, 194. A pivoting arm 195 is supported on the distal end of the housing 11, the pivoting arm 195 provided at one end with a fifth active-engagement part 196 that is retracted by the contact part 22 of the power-receiving electrical connector 2 and provided at the other end with a securing part 197 for securing or releasing the middle plate 192 to or from the position shown in FIG. 6A. An elastic body such as a coil spring or the like is provided in the center of rotation of the pivoting arm 195, and biases the fifth active-engagement part 196 in a protruding direction.

Figure 6B:
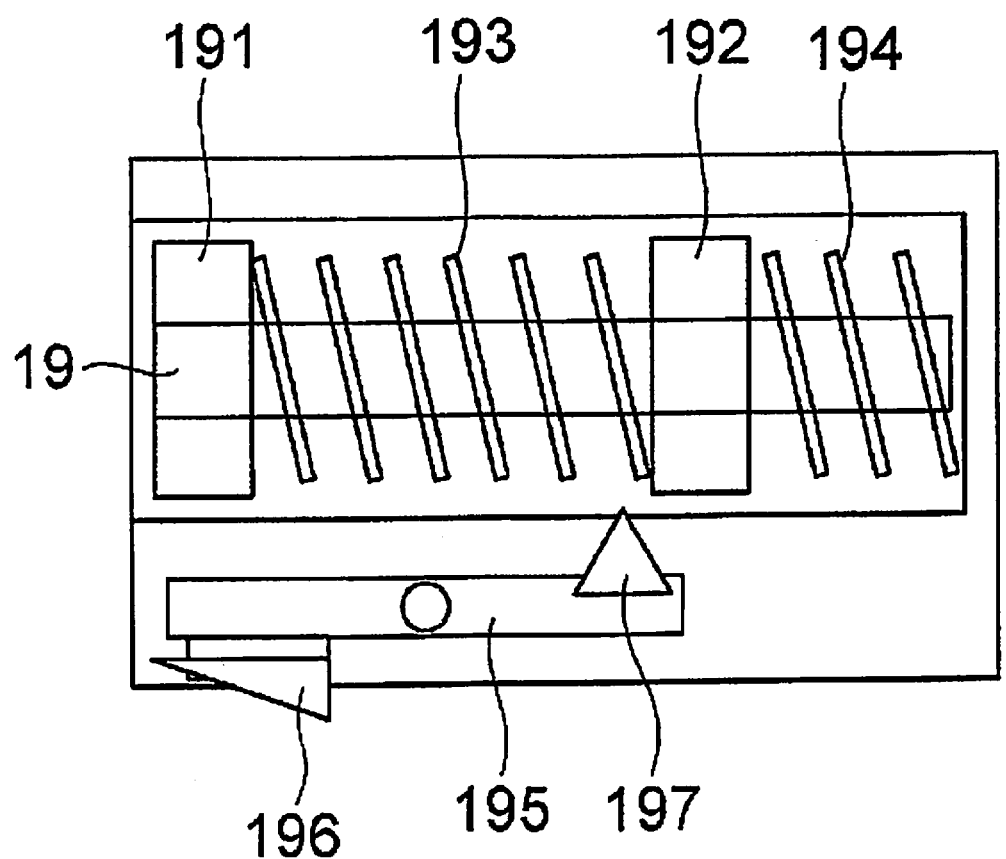
FIG. 6B is a sectional view showing the middle plate of FIG. 6A in a released state.
Figure 6C:
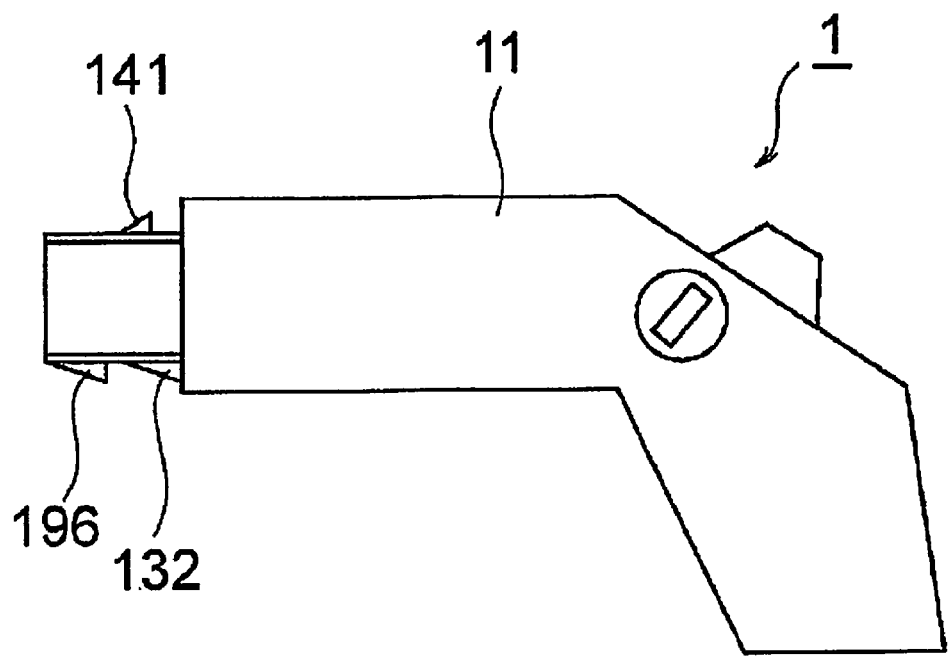
FIG. 6C is a component sectional view of the power-supplying electrical connector showing the position of the fifth active-engagement part in FIG. 6A.

In the state before the power-supplying electrical connector 1 is attached to the power-receiving electrical connector 2, the middle plate 192 is secured by the securing part 197 in a position where the left one of the two elastic bodies 193, 194 has increased elasticity, as shown in FIG. 6A. When the power-supplying electrical connector 1 is then attached to the power-receiving electrical connector 2, the fact that the fifth active-engagement part 196 is provided on the distal end of the power-supplying electrical connector 1 means that the fifth active-engagement part 196 is introduced immediately after the power-supplying electrical connector 1 is attached. The pivoting arm 195 thereby rotates clockwise as shown in FIG. 6B, and the middle plate 192 is released from being secured by the securing part 197, as shown in FIG. 6C. As a result, the middle plate 19 moves into a position in which the elastic forces of the two elastic bodies 193, 194 are equal. Specifically, because the elastic force of the elastic body 193 decreases, the movable member 191 can easily move to the right, and connecting with the power-receiving terminal 23 is facilitated.

Figure 7:
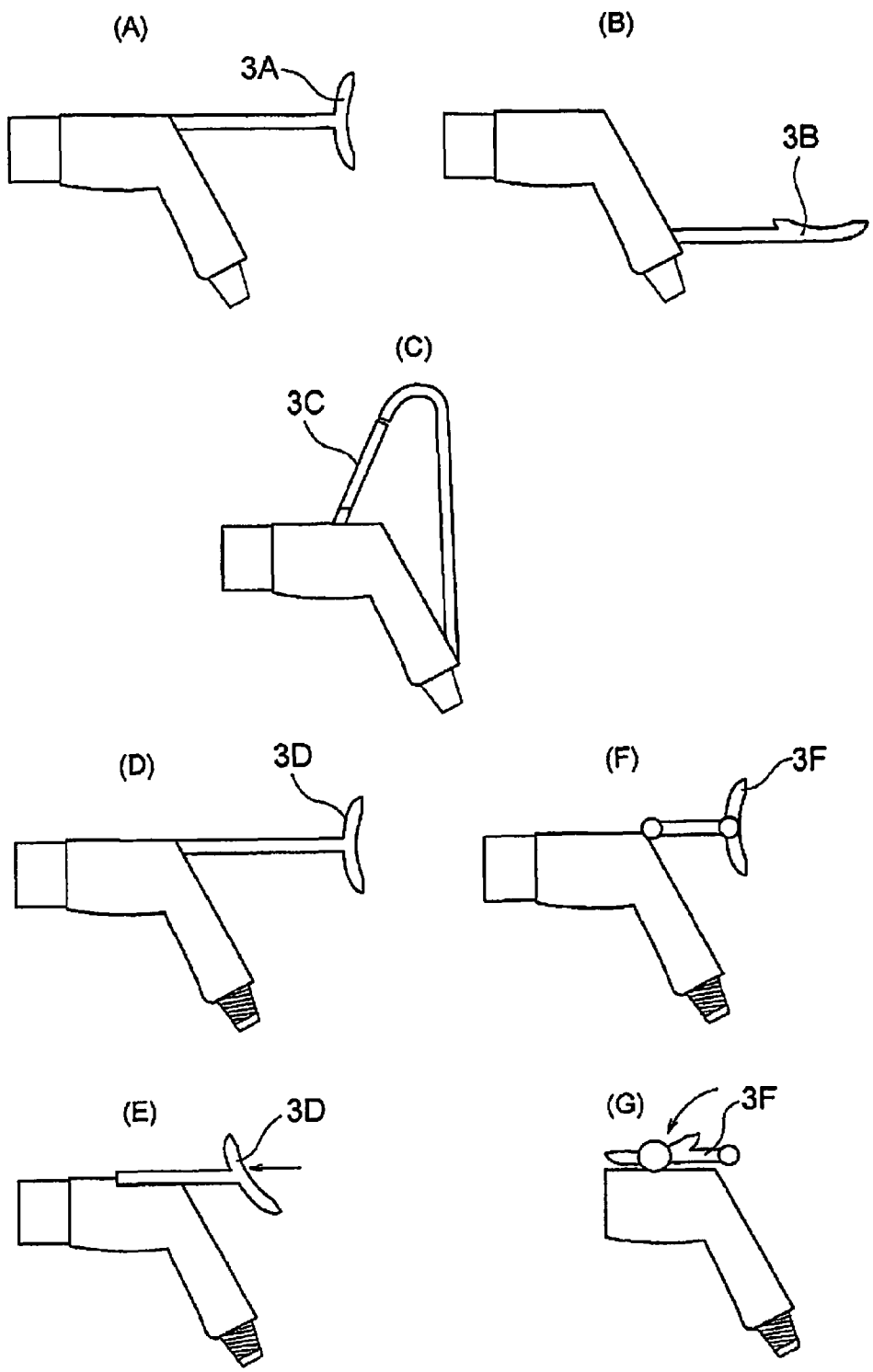
FIG. 7 is a view of the power-supplying electrical connector, showing a further embodiment.

FIG. 7 (A through G) shows views of further embodiments, and illustrates an example of assisting devices provided for use during attachment or detachment in view of the large weight of the power-supplying electrical connector 1. FIG. 7 (A) is an example in which a member 3A placed against a shoulder or two arms is secured to the housing 11, FIG. 7 (B) is an example in which a member 3B placed against a forearm is secured to the housing 11, and FIG. 7 (C) is an example in which a shoulder-mount member 3C is secured to the housing 11. FIG. 7 (D) is an example of a member 3D placed against a shoulder or two arms, the member 3D being constructed so as to be stowable in the direction of the arrow when not in use as shown in FIG. 7 (E). FIG. 7 (F) is an example of a member 3F similarly placed against a shoulder or two arms, the member 3F being constructed so as to be capable of being rotated and stowed in the direction of the arrow as shown in FIG. 7(G).

The first engaging member 13 corresponds to the one engaging member of the present invention, the second engaging member 14 corresponds to the other engaging member of the present invention, the damage-sensing member 17 and the microswitch 18 correspond to the detection device of the present invention, and the pivoting arm 195, the fifth active-engagement part 196, and the securing part 197 correspond to the release member of the present invention.

The invention claimed is:

1. A power-supplying electrical connector comprising:
   an engagement mechanism configured to engage a power-receiving electrical connector of an object to be charged, the engagement mechanism having a pair of engaging members; and
   an indicator member configured to disengage from the engagement mechanism and move from a charging-disabled position to a charging-enabled position, when the engagement mechanism has engaged the power-receiving electrical connector, so as to indicate engagement is complete, when the power-supplying electrical connector is attached to the power-receiving electrical connector while the indicator member is held in the charging-disabled position by engaging with a first engaging member of the pair of the engaging members, the engagement mechanism is configured to cause the first engaging member and the indicator member to disengage after a second engaging member of the pair of engaging members and the indicator member have engaged while the power-supplying electrical connector is being attached to the power-receiving electrical connector, and
   while the power-supplying electrical connector and the power-receiving electrical connector remain attached and engaged, the engagement mechanism is configured to cause the second engaging member and the indicator member to disengage.

2. The power-supplying electrical connector according to claim 1, wherein
   the indicator member is disposed on a housing of the power-supplying electrical connector so as to be capable of moving between the charging-disabled position and the charging-enabled position, and is elastically biased toward the charging-enabled position,
   the first engaging member has, at a first end, a first active-engagement part configured to engage a first passive-engagement part of the indicator member while the indicator member is in the charging-disabled position, and, at a second end, a contact part configured to contact the power-receiving electrical connector while the power-supplying electrical connector is attached to the power-receiving electrical connector, the first engaging member being rotatably disposed in the housing centered on a point between the first active-engagement part and the contact part, and being elastically biased in a direction of rotation in which the first active-engagement part approaches the first passive-engagement part, and
   the second engaging member has, at a first end, a second active-engagement part configured to engage a second passive-engagement part of the power-receiving electrical connector while the power-supplying electrical connector is attached to the power-receiving electrical connector, and, at a second end, a third active-engagement part configured to engage a third passive-engagement part of the indicator member while the indicator member is in the charging-disabled position, the second engaging member being rotatably disposed in the housing centered on a point between the second active-engagement part and the third active-engagement part, and being elastically biased in the direction of rotation in which the second active-engagement part approaches the second passive-engagement part.

3. The power-supplying electrical connector according to claim 2, further comprising:
   an auxiliary member rotatably disposed on the second engaging member, and configured to pivot to an engagement position so as to engage the indicator member while the indicator member is in the charging-disabled position, and configured to pivot from the engagement position to a disengagement position in which engagement with the indicator member is not possible while the power-supplying electrical connector is being attached to the power-receiving electrical connector.

4. The power-supplying electrical connector according to claim 1, further comprising
   a securing member configured to move so as to immobilize the indicator member while the indicator member is in the charging-enabled position; and
   a charge-permitting device configured to detect movement of the securing member, and to permit commencement of charging while the securing member moves to immobilize the indicator member.

5. The power-supplying electrical connector according to claim 2, wherein
   the second active-engagement part of the second engaging member is configured such that the second active-engagementpart is closer to the housing in an engaged state than when the second active-engagement part is in a disengaged state.

6. The power-supplying electrical connector according to claim 2, wherein
   the second active-engagement part of the second engaging member is configured so that the distance in the attaching direction between a position of the second active-engagement part in an engaged state and a position of the second active-engagement part in a disengaged state is greater than the length of the second passive-engagement part.

7. The power-supplying electrical connector according to claim 1, further comprising
   a power-supplying terminal configured to be connected to a power-receiving terminal of the power-receiving electrical connector;
   a movable member configured to be moved by an elastic body while the power-supplying terminal is connected to the power-receiving terminal;
   a middle plate disposed between the elastic body of the movable member; and
   a release member configured to release the middle plate when the power-supplying electrical connector is attached to the power-receiving electrical connector.

8. The power-supplying electrical connector according to claim 1, further comprising
   a detection device configured to detect damage between the second active-engagement part of the second engaging member and a center point of rotation.

9. The power-supplying electrical connector according to claim 2, further comprising
   a securing member configured to move so as to immobilize the indicator member while the indicator member is in the charging-enabled position; and
   a charge-permitting device configured to detect movement of the securing member, and to permit commencement of charging while the securing member moves to immobilize the indicator member.

10. The power-supplying electrical connector according to claim 3, wherein
    the second active-engagement part of the second engaging member is configured such that the second active-engagement part is closer to the housing in an engaged state than when the second active-engagement part is in a disengaged state.

11. The power-supplying electrical connector according to claim 3, wherein
the second active-engagement part of the second engaging member is configured so that the distance in the attaching direction between a position of the second active-engagement part in an engaged state and a position of the second active-engagement part in a disengaged state is greater than the length of the second passive-engagement part.

12. The power-supplying electrical connector according to claim 2, further comprising
a power-supplying terminal configured to be connected to a power-receiving terminal of the power-receiving electrical connector;
a movable member configured to be moved by an elastic body while the power-supplying terminal is connected to the power-receiving terminal;
a middle plate disposed between the elastic body of the movable member; and
a release member configured to release the middle plate when the power-supplying electrical connector is attached to the power-receiving electrical connector.

13. The power-supplying electrical connector according to claim 2, further comprising
a detection device configured to detect damage between the second active-engagement part of the second engaging member and a center point of rotation.

* * * * *